3,250,707
METHOD OF PREPARING SILICEOUS AMINO COMPOUNDS
Frederick J. Ihde, Jr., Mountain Lakes, and Jacob Levy, Livingston, N.J., assignors to Nopco Chemical Company, Newark, N.J., a corporation of New Jersey
No Drawing. Filed July 3, 1961, Ser. No. 121,350
9 Claims. (Cl. 252—28)

This invention relates to a method of preparing siliceous amino compounds. More particularly this invention relates to a method of preparing siliceous amino compounds, themselves prepared from the reaction between an imidazoline or an oxazoline salt and a water soluble silicate salt.

U.S. Patent No. 2,967,828, Ihde, issued January 1961, discloses and claims certain siliceous amino compounds. These materials are prepared by reacting, in an aqueous medium, partial amide salts with water soluble silicate salts in which said silicate salts are present in an amount sufficient to react with all of the acidic components of the partial amide salt. If the silicate salt is present in greater than the aforementioned amount, said amount hereafter being referred to as a stoichiometric amount, then after reaction between the partial amide salt and the silicate salt, the excess silicate salt can be converted to silicon dioxide by treatment with an acid, and the siliceous amino compound is then adsorbed or complexed upon the surface of the silicon dioxide. This silicon dioxide is referred to as free or uncombined silica or colloidal silica. The disclosure in U.S. Patent No. 2,967,828 is hereby incorporated into the present application by reference.

Patent Application Serial No. 836,086, filed August 26, 1959, and now U.S. Patent 3,129,181, describes and claims an improved process for preparing siliceous amino compounds. This process uses a substantially water insoluble organic liquid and is particularly advantageous because it overcomes excessively slow filtration rates, increased aggregate formation, and shrinkage of the filter cake during drying all of which were previously encountered in preparing these siliceous amino compounds. The disclosures contained in this latter mentioned copending application are hereby incorporated into the present case by reference.

Patent Application Serial No. 86,323, filed February 1, 1961, Ihde et al., and now U.S. Patent 3,168,539, describes and claims a still improved process for preparing siliceous amino compounds wherein fluosilicic acid or a water soluble inorganic fluosilicate salt is used. The use of these fluosilicates or fluosilicic acid enables one to prepare siliceous amino compounds in an improved manner when compared with the disclosure in U.S. Patent 2,967,828 and patent application Serial No. 836,086, now U.S. Patent 3,129,181. In addition, the use of fluosilicic acid or/and the fluosilicates resulted in the preparation of siliceous amino compounds of finer particles size and greater oil thickening power than was possible in U.S. Patent 2,967,828. The use of fluosilicic acid or/and the fluosilicates also overcame the problems of solvent loss encountered in patent application Serial No. 836,086, now U.S. Patent 3,129,181, when a volatile organic liquid was used. In addition, where a non-volatile, substantially water insoluble organic liquid was used, it was difficult to separate the organic liquid from the siliceous amino compound where desired, as for example in the fields of gas purification, recovery or removal of organic materials from aqueous systems, and the like. U.S. patent application Serial No. 86,323, now U.S. Patent 3,168,539, solved this last mentioned problem. The disclosure contained in patent application Serial No. 86,323, filed February 1, 1961, now U.S. Patent 3,168,539, is hereby incorporated by reference in the present application.

It has been found that while the use of fluosilicic acid or/and the fluosilicates was entirely satisfactory and an advancement in the art, still greases prepared using a siliceous amino compound prepared via a process wherein a fluosilicate or/and fluosilicic acid was used suffered from one disadvantage. The disadvantage encountered was that the grease had a tendency to bleed somewhat upon standing. While the amount of bleeding was not excessive, it was realized that reduction of this tendency to bleed would improve a grease which was prepared using a siliceous amino compound described in the previously referred to U.S. patent and patent applications. In addition, the siliceous amino compounds previously prepared, while possessing fine oil thickening properties, did not possess as fine oil thickening properties as was believed possible.

Aromatic compounds, that is, isophthalic acid, terephthalic acid, and water soluble salts thereof, described in patent application Serial No. 107,320, filed May 3, 1961, Ihde, now U.S. Patent 3,129,178, produced a very good product. In the last mentioned copending patent application, isophthalic acid, terephthalic acid or the water soluble salts thereof was used in the preparation of the siliceous amino compound. The aromatic acid could, if desired, be present in the final product, or the siliceous amino compound could be devoid of any aromatic acid. The disclosure contained in this last referred to patent application is hereby incorporated in the present case by reference.

However, in the preparation of a siliceous amino compound using an imidazoline or oxazoline salt and a water soluble silicate via any of the above methods several disadvantages were encountered. For example, when the siliceous amino compound was filtered, it was difficult to remove a substantial portion of the water therefrom. This excess water affected the siliceous amino compound in that the siliceous amino compound still tended to form aggregate particles during drying, thus yielding particles which were denser and coarser, than if more water had been removed, and which were difficult to grind. These denser and coarser particles affected the solvent thickening properties of the siliceous amino compound prepared using an imidazoline or/and oxazoline salt in that more of the siliceous amino compound was required to obtain the thickening effect obtainable if the particles were finer. In addition, even though, a siliceous amino compound was prepared using a fluosilicate salt or an aromatic compound such as isophthalic acid and terephthalic acid or a water soluble salt thereof, some aggregate formation of the siliceous amino compound, prepared utilizing an imidazoline and/or an oxazoline salt, during drying still took place. While the aggregate formation was not as pronounced as in the earlier issued patent and patent application 836,086, now U.S. Patent 3,129,181, still it was believed that reduction of the aggregate formation of the siliceous amino compounds would improve the solvent thickening and grease making properties of the siliceous amino compound prepared using an imidazoline and/or oxazoline salt. And even though the particle size of this class of siliceous amino compounds previously prepared were good via the previous methods, it was believed that if a siliceous amino compound having an even smaller particle size could be prepared it would further improve the solvent thickening and grease making properties of the product.

An object of this invention therefore is to reduce the moisture content of the siliceous amino compound prior to drying said compound.

Another object of this invention is to reduce aggregate formation of the siliceous amino compound during drying.

Still another object is to prepare a siliceous amino compound having improved solvent thickening and grease making properties.

Other objects and advantages will become apparent from the following more complete description and claims.

Broadly, this invention contemplates in a process for preparing a siliceous amino compound by reacting (a) at least one material selected from the class consisting of imidazoline salts and oxazoline salts with (b) at least one water soluble silicate salt selected from the class consisting of potassium silicates, ammonium silicates, and sodium silicates, and separating water from the resultant slurry to obtain a solid cake, the steps comprising freezing the cake, thawing out said cake and filtering the thawed out cake to remove additional water from said cake.

As used in this specification and claims, the term siliceous amino compound encompasses products as described in the above identified U.S. patent and patent applications, which contain only silica combined with an imidazoline salt or/and an oxazoline salt, products which contain both uncombined silica and silica combined with an imidazoline salt and/or an oxazoline salt, products which contain combined silica only and aromatic compound, and products which contain combined silica, uncombined silica and an aromatic compound.

The terms filtration and filtering, as used in the specification and claims, encompass dewatering the siliceous amino compound by mechanically passing the water through the siliceous amino compound particles. Thus the terms encompass dewatering the siliceous amino compound using a Buchner funnel, a conical funnel and conical filter paper, a filter press, centrifuging, and the like. When a siliceous amino compound is filtered gravitationally using a conical funnel and conical filter paper, the filtration is quite slow and for that reason we do not prefer to filter in this manner.

In the specification and claims, reference is made to Alkaterage A, E, C, and T. All of these materials were obtained from Commercial Solvents Corporation and correspond to the following formula:

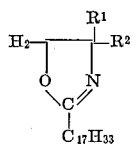

| Alkaterge | R¹ | R² |
| --- | --- | --- |
| A | Methyl | Methyl. |
| E | Ethyl | Hydroxymethyl. |
| C | Methyl | Hydroxymethyl. |
| T | Hydroxymethyl | Hydroxymethyl. |

Generally speaking, the siliceous amino compounds contemplated in this invention can be prepared by reacting a water soluble silicate salt such as sodium silicates, potassium silicates, ammonium silicates, and the like with an imidazoline salt or/and an oxazoline salt. Among the imidazoline and oxazoline compounds which can be employed to prepare their salts used in practicing this invention are the fatty imidazolines of stearic and oleic acids and naphthenic acid and the like with diethylene triamine, triethylene tetramine and the like; oxazolines such as Alkaterge A, Alkaterge C, Alkaterge E, Alkaterge T, and the like. Among the acids which can be used to prepare the imidazoline and oxazoline salts from the imidazoline and oxazoline compounds themselves are acetic acid, propionic acid, hydrochloric acid, sulfuric acid and the like. The manner of forming imidazoline and oxazoline salts are well known in the art and this invention is not to be construed as limited to any particular mode of preparing the imidazoline and oxazoline salts.

While the above is the basic reaction, conditions may be varied in that excess silicate salt can be used. When excess silicate is used, the resultant siliceous amino compound contains fine particles of silica and the siliceous amino compound is adsorbed or complexed upon the surface of the silica. For example, the excess silicate salt may be converted to a colloidal fine silica such as a silica gel or sol by treating the silicate salt with an acid such as sulfuric acid before the stoichiometric amount of the silicate is reacted with the oxazoline salt or/and the imidazoline salt. Alternatively, the imidazoline or/and the oxazoline salt may be reacted initially with an excess of the silicate salt and the excess silicate subsequently converted to silica, or, excess silica may be converted to a colloidal fine silica and the imidazoline or/and oxazoline salt may then be reacted with additional excess silicate salt.

Additives, such as fluosilicic acid or a water soluble fluosilicate salt may also be added as is described in U.S. patent application Ser. No. 86,323, referred to above. Generally speaking, the fluosilicic acid or fluosilicate salt may be present at any stage of the preparation as long as it is present either before or during the formation of the siliceous amino compound. Among the water soluble fluosilicate salts which can be used are sodium fluosilicate, potassium fluosilicate, ammonium fluosilicate, magnesium fluosilicate, manganese fluosilicate, nickel fluosilicate, aluminum fluosilicate, rubidium fluosilicate, cesium fluosilicate, silver fluosilicate, cobaltous fluosilicate, thallium fluosilicate, zinc fluosilicate, cupric fluosilicate, lithium fluosilicate, hydrazine fluosilicate, hydroxylamine fluosilicate, amine fluosilicate and the like.

We can also use isophthalic acid, terephthalic acid or a water soluble salt thereof such as zinc terephthalate, magnesium terephthalate, zinc isophthalate, magnesium isophthalate, sodium terephthalate, potassium isophthalate, barium isophthalate and the like in preparing a siliceous amino compound as described in U.S. Ser. No. 107,320 above. The isophthalic acid, terephthalic acid or water soluble salts thereof can be added at any time during the preparation and prior to the drying of the filter cake. If desired, isophthalic acid or terephthalic acid can be added in such a manner so that they remain part of the siliceous amino compound and are interspersed in and around the siliceous amino compound particles. This is done merely by precipitating isophthalic acid or terephthalic acid from its water soluble salt at any time before removing water from the reaction slurry containing the siliceous amino compound. In order to keep the isophthalic acid or terephthalic acid as a part of the composition of the siliceous amino compound, the slurry before water is removed by filtering, decanting, centrifuging or the like, must be acid. If it is alkaline, then the isophthalic acid or terephthalic acid will be converted to its water soluble salt, and upon filtering and washing the filter cake, or upon removing water in any other manner such as centrifuging or the like, the water soluble salt will be substantially removed therefrom and a siliceous amino compound containing no isophthalic or terephthalic acid will have been prepared.

In all of the aforedescribed methods and variations for preparing a siliceous amino compound, one or more water insoluble organic liquids as described in copending application Serial No. 836,086, filed August 26, 1959, may be used in preparing a siliceous amino compound. The water insoluble organic liquid, if used, must be present no later than when the siliceous amino compound is formed, if said liquid is to be of optimum value. Some of the water insoluble organic liquids which can be used are Varnish Makers' and Painters' naphtha, xylene, n-butanol, capricaldehyde, benzene, vegetable and fish oils, and the like. In addition to organic compounds which are liquids, we may use organic compounds which are solids at room temperature but which can be liquefied under our operating temperatures such as eicosane, paraffin wax, and the like. These liquids and solids and their use are more fully described in copending application Serial No. 836,086, filed August 25, 1959. The disclosure in Serial No. 836,086 is hereby incorporated into the present case by reference.

By the term operating temperature, we mean the temperature at which the imidazoline or oxazoline salt reacts with the silicate salt to form the siliceous amino compound.

When the reaction is complete, i.e., when the siliceous amino compound is formed, water may be initially removed in any manner which will assure the presence of the siliceous amino compound as a cake. Thus, we may initially remove water by filtering the reaction slurry, by centrifuging, by using a filter press and the like.

Alternatively, water can be initially removed using any combination of water removal processes so long as a cake is obtained after the initial water removal. Thus, we can first drain off the water if two layers form, and then filter or centrifuge, etc. to initially remove water and obtain a cake.

When the reaction is complete and the siliceous amino compound is filtered, or centrifuged, or the like, the cake is then frozen. The cake may be frozen in any type of convenient apparatus and the temperature employed is not critical except that the temperature must be sufficient to freeze the cake. The cake is kept in a frozen condition for as long as is desired before it is thawed out. The length of time that the cake is kept frozen is not critical, and the cake may even be thawed out immediately after it is frozen.

When the cake is thawed out, any temperature up to and including the boiling point of the liquids present, in the apparatus employed, or of an azeotrope, if one is formed, can be used.

We have found that by freezing the cake we may remove as much as 50% or more of the water remaining after the initial dewatering.

In the examples which follow, reference is made to the percent of water present in the cake. In determining the percent of water present, the basis used was the calculated total weight of the cake before freezing the cake and after the initial dewatering. All water percentages were determined on a calculated basis only, taking into consideration the calculated weight of all other materials present.

In the examples, where an imidazoline compound was used, unless otherwise indicated, the imidazoline compound is the product of the reaction of one mole of a fatty acid and one mole of an amine.

In the examples which follow, unless otherwise indicated, all filtrations were accomplished using a Buchner funnel.

In order to illustrate the nature of this invention and the manner of practicing the same, the following examples are presented.

EXAMPLE I

The purpose of this example is to illustrate the removal of additional water by freezing the filter cake after filtering, thawing the filter cake, and filtering again.

(A) *Preparation of the silica sol*

302.5 grams of a 40° Bé. sodium silicate solution ($Na_2O:3.22SiO_2$) diluted with 302.5 cc. of water and a solution of 50 grams of 96% sulfuric acid diluted with 250 cc. of water were slowly added to 2200 cc. of water, at room temperature. Care was taken to keep the acid in excess so that the reaction mass was at all times acid to Congo red paper. A clear silica sol formed, and it was mixed at room temperature for ½ hour and then digested for 22 hours.

(B) *Preparation of the imidazoline acetate salt*

12.5 grams of the imidazoline of oleic acid and aminoethylethanolamine was heated to a temperature of 80 to 85° C. and 6.0 grams of glacial acetic acid were added thereto thus forming the imidazoline acetate salt. The acetate salt was dissolved in 125 grams of a 320 second Saybolt viscosity naphthenic base oil and the solution was diluted with 125 grams of Varnish Makers' and Painters' naphtha at a temperature of 70 to 75° C.

(C) *Preparation of the siliceous amino compound*

A dilution of 100 grams of a 40° Bé. sodium silicate solution ($Na_2O:3.22SiO_2$) was diluted with 100 cc. of water and this solution and the imidazoline acetate salt solution prepared in part B were added to the silica sol prepared in part A with agitation. Care was taken during the addition to keep the imidazoline acetate salt in excess in order to minimize gel formation. A sample of the slurry was removed and filtered. The pH of the sample filtrate was 7.8 and 0.5 gram of 96% sulfuric acid was added to the slurry so that the filtrate of a subsequent sample of the slurry had a pH of 7.4.

(D) *Recovery of the siliceous amino compound*

The adjusted slurry was heated to a temperature of 60 to 65° C. and filtered. The filter cake was washed four times, each time by agitating the filter cake with 1000 cc. of water for 20 minutes at 60 to 65° C. and filtering.

The filter cake contained approximately 76.5% of water based on the weight of the filter cake after the initial dewatering. The filter cake was then frozen in a Dry Ice chest to a hard solid. It was then thawed out to a temperature of 60 to 65° C. Upon thawing out, the filter cake liquified. When the thawed out, liquified filter cake was filtered, approximately 850 cc. of water was obtained from approximately 1590 grams of filter cake. By this freezing, thawing procedure, the moisture content of the cake was reduced to 49.3% before drying. The filter cake was then dried at a temperature of 150 to 155° F. Filter cake shrinkage during drying was 13.3% thus indicating that little agglomeration of the particles took place during drying.

EXAMPLE II

The purpose of this example is to illustrate the use of a different imidazoline salt in practicing this invention and to illustrate that a silica sol or gel need not be prepared in order to practice this invention.

(A) *Preparation of the imidazoline acetate salt*

15.25 grams of glacial acetic acid were added to 31.25 grams of the imidazoline of coconut fatty acid and diethylene triamine thus forming the imidazoline acetate salt which was then dissolved in 594 cc. of water at a temperature of 68 to 70° C.

(B) *Preparation of the siliceous amino compound*

The imidazoline acetate salt of part A was added to a dilution of 335 grams of a 40° Bé. sodium silicate solution ($Na_2O:3.22SiO_2$) diluted in 2025 cc. of water. The addition of the imidazoline acetate salt was accomplished with agitation at a temperature of 35 to 40° C. during a period of ½ hour. The resultant milky slurry was mixed for 15 minutes at 35 to 40° C. A dilution of 60 grams of hydrochloric acid (37.6%) in 120 cc. of water was slowly added to the slurry over a period of one hour at a temperature of 35 to 40° C. When approximately ½ of the hydrochloric acid dilution had been added, 125 grams of Varnish Makers' and Painters' naphtha was added and agitation was continued. By adding the naphtha at this stage of the preparation, heavy gel formation was avoided. The pH of the filtrate from a sample of the slurry was 8.5 and 5.0 grams of 37.6% hydrochloric acid was added to the slurry and a sample of the slurry was again removed and filtered. The pH of the filtrate of the second sample was 7.9.

(C) *Recovery of the siliceous amino compound*

The reaction slurry was filtered at a temperature of 40° C. The filter cake containing about 80% water was washed four times at a temperature of 50 to 70° C. in the manner of Example I. The washed filter cake was frozen at a temperature of 4° F. and was then thawed to a temperature of 60 to 65° C. Upon thawing, the filter cake became fluid making it possible to filter off an additional 450 cc. of water. The final filter cake had a water content of 68.4% before drying. The siliceous amino compound was dried at a temperature of 150 to 155° F. There was no readily measurable shrinkage of the filter cake during drying.

EXAMPLE III

The purpose of this example is to illustrate the use of still another imidazoline salt in practicing this invention.

(A) *Preparation of the silica sol*

The sol was prepared in the manner of Example I except that after the sol was digested for 22 hours at room temperature, it was heated to 70 to 75° C. and 125 grams of a 320 second Saybolt viscosity naphthenic base oil was added thereto.

(B) *Preparation of the imidazoline acetate salt*

12.5 grams of the imidazoline of hydrogenated tallow fatty acids and diethylene triamine was melted at 75 to 80° C. To this melt was added 4.3 grams of glacial acetic acid in order to form the imidazoline acetate salt which was then dissolved in 237.5 cc. of water at a temperature of 75 to 80° C.

(C) *Preparation of the siliceous amino compound*

A dilution of 100 grams of a 40° Bé. sodium silicate solution ($Na_2O:3.22SiO_2$) in 100 cc. of water and the imidazoline acetate salt solution were simultaneously added to the silica sol of part A. Care was taken to keep the acetate salt in excess during the addition. After approximately ½ of the sodium silicate solution had been added, the reaction mass started to thicken and 125 grams of Varnish Makers' and Painters' naphtha was added thereto in order to reduce gel formation. The addition of the sodium silicate solution was then continued. The pH, determined as in Example I was 9.1 and was adjusted as in Example I to 7.65 by the addition of approximately 2.5 grams of 96% sulfuric acid. The reaction mass was agitated for one hour and allowed to cool to 55° C. whereupon it was digested for 22 hours at room temperature.

(D) *Recovery of the siliceous amino compound*

The reaction slurry was heated to 70° C., filtered, washed four times at a temperature of 70 to 75° C. in the manner of Example I.

1500 grams of the filter cake containing about 75% water was then frozen solid in a Dry Ice chest. The frozen filter cake was then thawed out and heated to a temperature of 80 to 85° C. After thawing, the filter cake was in a fluid condition making it possible to remove an additional 500 cc. of water by filtering and the water content of the refiltered filter cake was thereby reduced to approximately 60% by weight of the filter cake before drying. The filter cake was dried at a temperature of 150 to 155° F.

EXAMPLE IV (A) *Preparation of the imidazoline acetate salt*

31.25 grams of the imidazoline of hydrogenated tallow fatty acids and diethylene triamine was melted at a temperature of from 70 to 75° C. To this melt was added 11.5 grams of glacial acetic acid thus forming the imidazoline acetate salt. The clear acetate salt was then dissolved in 594 cc. of water at a temperature of 80 to 85° C.

(B) *Preparation of the siliceous amino compound*

A dilution of 335 grams of a 40° Bé. sodium silicate solution ($Na_2O:3.22SiO_2$) in 2025 cc. of water was prepared. The imidazoline acetate salt solution was added, with agitation, to the sodium silicate dilution over a period of 35 minutes. A yellowish slurry formed. 65 grams of hydrochloric acid (37.6%) was diluted with 1300 cc. of water. The hydrochloric acid dilution was slowly added during a one hour period to the yellowish slurry. When approximately ½ of the hydrochloric acid dilution has been added, 125 grams of Varnish Makers' and Painters' naphtha was added thereto, to assure that the reaction mass would remain in a fluid and mixable state. The remainder of the hydrochloric acid dilution was then slowly added. The pH, determined as in Example I, was 9.3 and was adjusted to a pH of 7.9, by the addition of approximately 9.0 grams of 37.6% hydrochloric acid, to the slurry.

(C) *Recovery of the siliceous amino compound*

The reaction slurry was mixed at a temperature of 70 to 75° C. for one hour and filtered. The filter cake was washed four times at a temperature of 70 to 75° C. in the manner of Example I. Approximately 1190 grams of washed filter cake containing about 79% water was frozen in a Dry Ice chest and was then thawed out to a temperature of 60 to 65° C. The solid filter cake by this freezing and thawing treatment was changed to a very viscous liquid which made it possible to remove approximately an additional 300 cc. of water by filtering. The water content of the filter cake was now reduced to about 71.9% before drying. The filter cake was dried at a temperature of 150 to 155° F.

EXAMPLE V

The purpose of this example is to illustrate that an oxazoline salt and a water soluble fluosilicate salt can be used in practicing this invention.

(A) *Preparation of the silica sol*

2.5 grams of sodium fluosilicate was dissolved in 2200 cc. of water. 280 grams of a 40° Bé. sodium silicate ($Na_2O:3.22SiO_2$) solution diluted with 280 cc. of water, and 47 grams of sulfuric acid (96%) diluted with 190 cc. of water were added simultaneously to the sodium fluosilicate solution. The addition was accomplished slowly and with agitation. Care was taken to keep the acid always in excess so that the reaction mass was at all times acid to Congo red paper.

(B) *Preparation of the oxazoline acetate salt*

12.5 grams of Alkaterge C, an oxazoline compound obtained from Commercial Solvents Corporation, was mixed with 3.7 grams of glacial acetic acid thus forming the oxazoline acetate salt. 237.5 cc. of water was then added to this oxazoline salt and a gelatinous milky dispersion formed and was agitated at a temperature of 75 to 80° C.

(C) *Preparation of the siliceous amino compound*

122.5 grams of a 40° Bé. sodium silicate solution ($Na_2O:3.22SiO_2$) was diluted with 122.5 cc. of water and this sodium silicate dilution and the oxazoline acetate salt were added at the same time with agitation to the silica sol of preparation A. The addition was accomplished at a temperature of 60 to 64° C., care being taken to keep the oxazoline salt in excess during the addition. When approximately ½ of the sodium silicate dilution and ½ of the oxazoline salt had been added, 187.5 grams of Varnish Makers' and Painters' naphtha were added thereto. After the addition of the naphtha, the addition of the oxazoline salt and the sodium silicate dilution was continued. A sample of the siliceous amino compound slurry was removed and filtered and had a pH of 8.3 and approximately 2 grams of 96% sulfuric acid was added to the slurry and a sample removed and filtered. The pH of the filtrate was now 7.4. The slurry was mixed for one hour and at a temperature of 60 to 64° C.; it was then digested for 21 hours at room temperature.

(D) *Recovery of the siliceous amino compound*

The slurry was heated with agitation to a temperature of from 70 to 75° C. and was filtered. The filter cake was washed four times at a temperature of 70 to 75° C. Each time the filter cake was washed by adding 1500 cc. of water and agitating the mixture for 20 minutes.

Approximately 1640 grams of the filter cake containing 81% water after the initial dewatering, was frozen in a Dry Ice chest and was then thawed out at a temperature of from 60 to 64° C. The solid filter cake, upon being thawed, became a liquid slurry making it possible to remove an additional 940 cc. of water by refiltering. The thawed, refiltered filter cake contained approximately 55.4% water before drying. The siliceous amino compound was dried at 150 to 155° F. Shrinkage of the filter cake during drying was 17.8%.

EXAMPLE VI

The purpose of this example is to illustrate that other oxazoline salts may be used in the process of this invention.

(A) *Preparation of the silica sol*

The silica sol was prepared in the manner of Example V except that 250 grams of sodium silicate diluted in 250 cc. of water was used.

(B) *Preparation of the oxazoline acetate salt*

12.5 grams of Alkaterge T, an oxazoline compound obtained from Commercial Solvents Corporation, was melted at a temperature of 65 to 70° C. and 3.7 grams of glacial acetic acid were added thereto thus forming the oxazoline acetate salt which was then dissolved in 187.5 grams of Varnish Makers' and Painters' naphtha at a temperature of 70 to 75° C.

(C) *Preparation of the siliceous amino compound*

152.5 grams of sodium silicate ($Na_2O:3.22SiO_2$), a 40° Bé. solution was diluted with 152.5 cc. of water. The oxazoline acetate salt and the sodium silicate dilution were added at the same time to the silica sol of preparation A, at a temperature of 60 to 65° C. During the addition, care was taken to keep the oxazoline acetate salt in excess at all times. The reaction mass gelled but remained fluid and mixable. A sample was removed from the siliceous amino compound slurry and filtered. The filtrate had a pH of 9.0 and approximately 2.7 grams of 96% sulfuric acid was added to the slurry and a sample again removed and filtered. The pH was now 7.7. The reaction mass was then agitated for one hour at a temperature of 60 to 65° C. and was then digested for 22 hours at room temperature.

(D) *Recovery of the siliceous amino compound*

The reaction mass was agitated while heating to a temperature of 70 to 75° C., filtered and washed four times as in Example V.

Approximately 1620 grams of filter cake containing 81.7% of water was frozen in a Dry Ice chest and was then thawed to a temperature of 65 to 70° C. After thawing it was noticed that the filter cake had liquefied making it possible to filter off approximately an additional 650 cc. of water and to obtain a filter cake which had a water content of 68.2% before drying. The siliceous amino compound was then dried at a temperature of 150 to 155° F. Shrinkage during drying was 21.9%.

As has been shown, the process of this invention is effective in removing additional water from a siliceous amino compound. The removal of additional water is much desired because aggregate formation of the siliceous amino compound particles is substantially avoided during drying. This results in a siliceous amino compound of finer particle size. The finer particle size of the siliceous amino compound prepared according to the process of this invention is particularly advantageous because the oil thickening power of a finer siliceous amino compound particle is greater than the oil thickening power of a coarser particle.

The siliceous amino compounds prepared by the process of the present invention are useful in grease compositions, to cure polyesters, as mold release agents, natural or synthetic rubber additives, stabilizers for halogen containing vinyl polymers, elevation of melting points, increase of hot viscosity of waxes and resins, thickeners for plastisols, plastigels or organosols, as a thermal insulating medium, wire drawing lubricants, flatting agents, as well as other uses.

While this invention has been described in terms of certain preferred embodiments and illustrated by means of specific examples, these are illustrative only and are not to be construed as limiting except as set forth in the following claims.

Having described our invention, what we claim and desire to secure by Letters Patent is:

1. In a process for preparing a siliceous amino compound by reacting (a) at least one salt of a compound selected from the class consisting of imidazoline compounds and oxazoline compounds, said imidazoline compounds being selected from the group consisting of fatty imidazoline compounds and naphthenic imidazoline compounds and said oxazoline compounds being fatty oxazoline compounds with (b) at least stoichiometric quantities of at least one water soluble silicate salt selected from the class consisting of potassium silicates, ammonium silicates, and sodium silicates, and separating water from the resultant slurry to obtain a solid cake, the improvement comprising freezing said cake, thawing out said cake, and filtering the thawed out cake to remove additional water from said cake.

2. A process according to claim 1, wherein said material is reacted with said water soluble silicate salt in the presence of a second material selected from the class consisting of fluosilicic acid and water soluble fluosilicate salts.

3. A process according to claim 1, wherein an aromatic compound selected from the class consisting of isophthalic acid, terephthalic acid and water soluble salts thereof is present before said resultant slurry is filtered.

4. A process according to claim 1, wherein a water insoluble organic compound is present, said compound being a liquid at the operating temperature of the process.

5. A process according to claim 1, wherein said material is reacted with more than a stoichiometric amount of said water soluble silicate salt.

6. A process according to claim 1, wherein the reaction of said material with said water soluble silicate salt is accomplished in the presence of colloidal silica.

7. A process according to claim 6, wherein said material is reacted with said water soluble silicate salt in the presence of a second material selected from the class consisting of fluosilicic acid and water soluble fluosilicate salts.

8. A process according to claim 6, wherein an aromatic compound selected from the class consisting of isophthalic acid, terephthalic acid and water soluble salts thereof is present before said resultant slurry is filtered.

9. A process according to claim 6, wherein a water insoluble organic compound is present, said compound being a liquid at the operating temperature of the process.

References Cited by the Examiner

UNITED STATES PATENTS

| | | | |
|---|---|---|---|
| 2,028,296 | 1/1936 | Shoemaker | 34—5 X |
| 2,036,906 | 1/1937 | Dourif | 34—5 X |
| 2,278,223 | 3/1942 | Sturgeon | 260—683.3 X |
| 2,315,024 | 3/1943 | Sturgeon | 252—455 X |

DANIEL E. WYMAN, *Primary Examiner.*

JULIUS GREENWALD, *Examiner.*

J. R. SEILER, *Assistant Examiner.*